(12) United States Patent
Fukushima et al.

(10) Patent No.: US 7,611,434 B2
(45) Date of Patent: Nov. 3, 2009

(54) HYDRAULIC CONTROLLING APPARATUS FOR AUTOMATIC TRANSMISSION FOR VEHICLE

(75) Inventors: Hiroshi Fukushima, Toyota (JP); Naoki Kato, Aichi-ken (JP); Kenichi Tsuchida, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 401 days.

(21) Appl. No.: 11/553,717

(22) Filed: Oct. 27, 2006

(65) Prior Publication Data

US 2007/0117678 A1 May 24, 2007

(30) Foreign Application Priority Data

Nov. 24, 2005 (JP) ............................. 2005-338942

(51) Int. Cl.
*F16H 31/00* (2006.01)
(52) U.S. Cl. ....................................... 475/119; 477/906
(58) Field of Classification Search ................. 475/119, 475/133; 477/906, 125, 127, 907; 701/62
See application file for complete search history.

(56) References Cited

U.S. PATENT DOCUMENTS

| 4,628,772 | A * | 12/1986 | Nishikawa et al. ........... 477/125 |
| 6,537,180 | B2 * | 3/2003 | Kim et al. .................... 477/130 |
| 6,929,584 | B2 * | 8/2005 | Miyata et al. ................ 477/119 |
| 6,942,591 | B2 * | 9/2005 | Park ............................ 475/127 |
| 7,134,536 | B2 * | 11/2006 | Morise et al. ............... 192/3.58 |
| 7,244,209 | B2 * | 7/2007 | Nozaki et al. ................ 475/119 |
| 7,255,212 | B2 | 8/2007 | Morise et al. |
| 2007/0032329 | A1 * | 2/2007 | Morise et al. ................ 475/116 |

FOREIGN PATENT DOCUMENTS

| DE | 103 36 520 A1 | 2/2004 |
| DE | 10 2004 031 727 A1 | 1/2005 |
| JP | 2002-533630 | 10/2002 |
| JP | 2004-69016 | 3/2004 |
| JP | 2005-265101 | 9/2005 |

* cited by examiner

*Primary Examiner*—David D Le
*Assistant Examiner*—Justin Holmes
(74) *Attorney, Agent, or Firm*—Oblon, Spivak, McClelland, Maier & Neustadt, L.L.P.

(57) ABSTRACT

The fail-safe gear step switching valve (120) can be switched to the first position to establish the low-speed side fail-safe gear step (third speed-change gear step) or the second position to establish the high-speed side fail-safe gear step (fifth speed-change gear step). Upon the failure state of the solenoid valve device (SLC1, SLC2), the fail-safe gear step switching valve is held at the second position by the line hydraulic pressure ($P_{L1}$). Two kinds of the fail-safe gear steps i.e., the third speed-change gear step and the fifth speed-change gear step can be established depending on the vehicle state just before the failure occurrence of the fail-safe gear step switching valve. Even if the D→N operation of the shift lever (72) is performed during the vehicle running in the fifth speed-change gear step, the fail-safe gear step switching valve remains at the second position to establish the fifth speed-change gear step even upon the shifting operation of the shift lever to the "D" position again.

13 Claims, 4 Drawing Sheets

|      | C1 | C2 | B1 | B2 | B3 |
|------|----|----|----|----|----|
| 1ST  | ○  |    |    | ○  |    |
| 2ND  | ○  |    | ○  |    |    |
| 3RD  | ○  |    |    |    | ○  |
| 4TH  | ○  | ○  |    |    |    |
| 5TH  |    | ○  |    |    | ○  |
| 6TH  |    | ○  | ○  |    |    |
| R    |    |    |    | ○  | ○  |
| N    |    |    |    |    |    |

HYDRAULIC CONTROLLING APPARATUS FOR AUTOMATIC TRANSMISSION FOR VEHICLE

The present application is based on Japanese Patent Application No. 2005-338942 filed on Nov. 24, 2005, the content of which is incorporated herein by reference.

BACKGROUND OF THE INVENTION

1. Field of the Invention

The present invention relates to a hydraulic controlling apparatus for an automatic transmission for vehicle in which speed-change steps are established by selectively operating hydraulic type frictionally engaging device by a solenoid valve device. In particular, it relates to a fail-safe technique for allowing the vehicle rung even in a failure state of the solenoid valve device.

2. Description of Related Art

In an automatic transmission, one of plural speed-change steps is established in a alternative way by a hydraulic controlling apparatus. The hydraulic controlling apparatus includes plural hydraulic type frictionally engaging devices such as clutches and brakes, and a solenoid valve device for selectively operating the hydraulic type controlling apparatus. The solenoid valve device has a first solenoid first pressure regulation valve outputting the hydraulic pressure for establishing a low-speed side gear step of the automatic transmission, and a second solenoid pressure regulation valve outputting the hydraulic pressure for establishing a high-speed side gear step of the automatic transmission. In such the hydraulic controlling apparatus, the solenoid valve device is operated by command signals from an electronic controlling apparatus, to bring the hydraulic type frictionally engaging devices into an engaged state for establishing the speed-change step of the automatic transmission.

By the way, there may be an off-fail where the command signals from the electronic controlling apparatuses do not reach to the solenoid valve device for some reasons such as a wire malfunction or a disengagement of a connector, so that all of the solenoid valve devices are brought into failure state to stop operation thereof. In such failure state, there may be a fear that the hydraulic type frictionally engaging devices are not brought into the engaged state, resulting in that the speed-change step of the automatic transmission is not established to make the vehicle running impossible. In view of this, a fail-safe technique for bringing the hydraulic type frictionally engaging devices into the engaged state even when the solenoid valve device turns to the failure state for allowing the vehicle running has been developed.

For example, a patent document (Japanese Patent Application Laid-open No. 2004-69016) has disclosed the hydraulic controlling apparatus for the automatic transmission for vehicle using the fail-safe technique. This hydraulic controlling apparatus includes a switching valve shifted in accordance with a switch position change of a manual valve sequentially operated by a shifting lever. In detail, the switching valve is switched to a low-speed side position to establish a low-speed side gear step by hydraulic pressure for a forward running, or a high-speed side position to establish a high-speed side gear step by hydraulic pressure for a forward running. Also, the switching valve establishes the high-speed side fail-safe gear step when the hydraulic pressure for forward running is outputted, and is maintained in a low-speed side position to establish the low-speed side fail-safe gear step, after the hydraulic pressure for forward running is dropped.

Upon failure occurrence of the solenoid valve device during the vehicle running, if the shift lever is shifted to a forward running position i.e., "D" position and the hydraulic pressure for forward running is outputted, the high-speed side fail-safe gear step is established to allow the continuing vehicle running. To the contrary, upon failure occurrence of the solenoid valve device during the vehicle stoppage, if the shift lever is shifted to a neutral position i.e., "N" position where the hydraulic pressure for forward running is not outputted, the low-speed side fail-safe gear step is established to secure re-start and the low-speed running of the vehicle.

However, in the above conventional art, there may arise a drawback, when the shift lever is shifted from a "D" position to a "N" position, and then is shifted to the "D" position again, in the failure state of all the solenoid valve devices. That is, the conventional art is so constructed that, when such D→N→D operation is performed, a low-speed side fail-safe gear step is established regardless of the vehicle speed. As a result, when the D→N→D operation of the shift lever is preformed during the vehicle running in high speed, a driver may have a sense of incongruity.

SUMMARY OF THE INVENTION

The present invention is made in view of the above mentioned circumstance and therefore has an object to provide a hydraulic controlling apparatus for an automatic transmission which includes a manual valve, a solenoid valve device and a fall-safe gear step switching valve. The manual valve generates a hydraulic pressure for forward running, by being shifted to a valve position thereof in accordance with shifting operation to a forward running position of the shift operation positions. The solenoid valve device operates to supply an output hydraulic pressure to plural hydraulic type frictionally engaging device selectively for establishing plural speed-change steps of the automatic transmission. The fail-safe gear step switching valve is so constructed, upon failure state of the solenoid valve device, that a valve position thereof is switched to establish, of plural speed-change gear steps of the automatic transmission, a low-speed side fail-safe gear step or a high-speed side gear step both set in advance. For such automatic transmission, the hydraulic controlling apparatus operates to set a fail-safe gear step corresponding to a vehicle condition, to thereby secure the vehicle running even after failure occurrence of the solenoid valve device.

For realizing the above object, in the present invention, a hydraulic controlling apparatus for an automatic transmission for vehicle comprises (a) a hydraulic pump for outputting an operation oil pressure, (b) a manual valve for generating a hydraulic pressure for forward running based on the operation oil pressure, by being switched a valve position thereof in accordance with shifting operation to a forward running position, (c) a solenoid valve device, upon a normal state thereof, for selectively supplying an output hydraulic pressure to plural hydraulic type frictionally engaging devices to establish plural speed-change steps of the automatic transmission, and (d) a fail-safe gear step switching valve.

The fail-safe gear step switching valve is (i) upon a failure state of the solenoid valve device, switched at a first position to establish a low-speed side fail-safe gear step or a second position to establish a high-speed side fail-fail gear step, of plural speed-change steps of the automatic transmission, both set in advance based on the output hydraulic pressure from the solenoid valve device just before failure thereof occurs, so that the low-speed side fail-safe gear step or the high-speed side fail-safe gear step is selected in an alternatively way, and (ii) held at the second position based on a base pressure which is based on the operation oil pressure from the hydraulic pump and which does not fluctuate regardless of the valve position of the manual valve.

In this way, the fail-safe gear step switching valve is set, upon the failure state of the electronic valve device, at the first position to establish the low-speed side fail-safe gear step or the second position to establish the high-speed side fail-fail gear step both set in advance, based on the output hydraulic pressure from the electronic valve device just before the failure occurred. The fail-safe gear step switching valve is held at the second position, based on the base pressure which is based on the operation oil pressure from the hydraulic pump and which does not fluctuate regardless of the valve position of the manual valve. Accordingly, two steps of the fail-safe gear steps, that is the low-speed side fail-safe gear step and the high-speed side fail-safe gear step can be set depending on the vehicle state just before the solenoid valve device turned to the failure state.

In addition, during the vehicle running in the high-speed side fail-safe gear step, even if the shifting operation is performed to the position other than the forward running poison for example to a neutral position of the shifting operation positions, and the fail-safe gear step switching valve is once switched to the position not generating the hydraulic pressure for the forward running, the fail-safe gear step switching valve is held at the second position thereof as it is. Even when the shifting position is shifted or returned to the forward running again, the high-speed side fail safe gear step is established again.

With this, especially, during the vehicle running in the high-speed side fail-safe gear step, which is normally considered to be high-speed running, when the shifting operation position is shifted from the forward running position via the position other than it to the forward running position again, the low-speed side fail-safe gear step is not established. Thus, sense of incongruity by the driver is avoided to secure the vehicle running after failure occurrence of the solenoid valve device.

The fail-safe gear step switching valve can be held at the first position based on a decreased base pressure and biasing force of a bias member. With this, upon the failure occurrence of the solenoid valve device, when the operation oil pressure is not outputted from the hydraulic pump, for example when the ignition is turned off after the vehicle stoppage, the base pressure drops to switch the valve position of the fail-safe gear step switching valve to the first position. When the base pressure once dropped recovers again, for example turn on of the ignition after turned off thereof, the low-speed side fail-safe gear step is established. As a result, the starting and the low-speed running of the vehicle is secured to perform the suitable running after stoppage.

The solenoid valve device can include a first solenoid pressure regulation valve supplying the output hydraulic pressure to a first hydraulic type frictionally engaging device for establishing the low-speed side gear step including a lowest-speed gear step and the fail-safe gear step switching valve, and a second solenoid pressure regulation valve supplying the output hydraulic pressure to a second hydraulic type frictionally engaging device for establishing the high-speed side gear step including a highest-speed gear step and the fail-safe gear step switching valve. The fail-safe gear step switching valve is switched to the first position based on the output hydraulic pressure from the first solenoid pressure regulation valve, and switched to the second position based on the output hydraulic pressure from the second solenoid pressure regulation valve.

With this, when the solenoid valve device turned to the failure state under establishment of the low-speed side fail-safe gear step in which the output hydraulic pressure is supplied from the first solenoid pressure regulation valve, the first position of the fail-safe gear step switching valve switched at that time is held as it is to establish the low-speed side fail-safe gear step. In addition, when the solenoid valve device turned to the failure state under establishment of the high-speed side fail-safe gear step in which the output hydraulic pressure is supplied from the second solenoid pressure regulation valve, the second position of the fail-safe gear step switching valve switched at that time is held as it is to establish the high-speed side fail-safe gear step.

Accordingly, different from the case where establishing the high-speed side fail-safe gear step uniformly for the failure occurrence upon the vehicle running in the low-speed side gear step, lack of the driving force is avoided to secure the suitable vehicle running after stoppage. In addition, different from the case of establishing the low-speed side fail-safe gear step uniformly for the failure occurrence upon the vehicle running in the high-speed side gear step, sense of incongruity by the driver resulted from extremely increased rotation speed of the engine exceeding the excessive rotation area and strong engine brake is avoided to secure the suitable vehicle running after the failure occurrence.

The fail-safe gear step switching valve in the first position thereof outputs the hydraulic pressure for forward running to the first hydraulic type frictionally engaging device, and in the second position thereof outputs the hydraulic pressure for forward running to the second hydraulic type frictionally engaging device. The solenoid valve device can further include a third solenoid pressure regulation valve for supplying the output hydraulic pressure to a third hydraulic type frictionally engaging device establishing the low-speed side fail-safe gear step and the high-speed side fail-safe gear step together with the first hydraulic type frictionally engaging device and the second hydraulic type frictionally engaging device.

With this, upon the failure state of the solenoid valve device during the vehicle running in the low-speed side gear step the low-speed side gear step establishes the low-speed side fail-safe gear step, and upon the failure step of the solenoid valve device during the vehicle running in the high-speed side gear step the high-speed side gear step establishes the high-speed side fail-safe gear step.

The hydraulic controlling apparatus can further include a normal/failure switching valve to be switched to a normal-side position upon normal state of the solenoid valve device for allowing the output hydraulic pressure from the solenoid valve device to be supplied to the hydraulic type frictionally engaging device, or a failure-side position upon failure state of the solenoid valve device for allowing the hydraulic pressure for forward running or the base pressure to be supplied to the hydraulic type frictionally engaging device.

Specifically, the normal/failure switching valve (i) in the normal-side position thereof allows the output hydraulic pressure from the first solenoid pressure regulation valve to be supplied to the first hydraulic type frictionally engaging device, from the second solenoid pressure regulation valve to be supplied to the second hydraulic type frictionally engaging device, and from the third solenoid pressure regulation valve to be supplied to the third hydraulic type frictionally engaging device, and (ii) in the failure-side position thereof allows the hydraulic pressure for forward running from the fail-safe gear step switching valve to be supplied to the first hydraulic type frictionally engaging device or second hydraulic type frictionally engaging device, and the base pressure or the hydraulic pressure for forward running to be supplied to the third hydraulic type frictionally engaging device.

With this, upon the normal state of the fail-safe gear step switching valve other than the failure state thereof, regardless of the valve position of the fail-safe gear step switching valve, that is not via the fail-safe gear step switching valve, the output hydraulic pressure from the first solenoid valve device, the second solenoid valve device and the third solenoid valve device is respectively supplied to the first hydraulic type frictionally engaging device, the second hydraulic type frictionally engaging device and the third hydraulic type frictionally engaging device, for engagement and release thereof.

In addition, when the solenoid valve device turned to the failure state under establishment of the low-speed side gear step where the output hydraulic pressure is supplied from the first solenoid pressure regulation valve, the hydraulic pressure for forward running outputted in accordance with the first position held at that time bring the first hydraulic type frictionally engaging device into the engaged state, and the base pressure or the hydraulic pressure for forward running bring the third hydraulic type frictionally engaging device into the engaged state.

On the other hand, when the solenoid valve device turned to the failure state under establishment of the high-speed side gear step where the output hydraulic pressure is supplied from the second solenoid pressure regulation valve, the hydraulic pressure for forward running outputted in accordance with the second position held at that time bring the second hydraulic type frictionally engaging device into the engaged state, and the base pressure or the hydraulic pressure for forward running bring the third hydraulic type frictionally engaging device into the engaged state.

Further, the first solenoid pressure regulation valve, second solenoid pressure regulation valve and third solenoid pressure regulation valve can be normally-closed type pressure regulation solenoid valve. With this, upon failure state of the solenoid valve device, no output hydraulic pressure is supplied from the first solenoid valve device, the second solenoid valve device and the third solenoid valve device.

The base pressure can be a pressure-regulated value regulated by the pressure regulated valve. With this, the base pressure based on the operation oil pressure from the hydraulic pump not changing regardless of the valve position of the manual valve is supplied to the fail-safe gear step switching valve. In other words, the base pressure pressure-adjusted based on the operation oil pressure from the hydraulic pump is not via the manual valve supplied directly to the fail-safe gear step switching valve.

The manual valve outputs the hydraulic pressure for forward running depending on the position of a shift changing device operated to change shift operating position. That is, when the shift changing device is shifted to the neutral position to make the automatic transmission the neutral state i.e., disconnected state to interrupt the power transmitting therein, the manual valve does not output the hydraulic pressure for forward running. When the shift changing device is shifted to the forward running position to make the automatic transmission the connected state to interrupt the power transmitting therein, the manual valve outputs the hydraulic pressure for forward running.

Here, noted that the base pressure is, different from the hydraulic pressure for forward running, maintained in the predetermined value regardless of presence/absence of operation of the shift changing device, so that the valve position of the fail-safe gear step switching valve is continuingly maintained at the time when the failure occurred even after the shift changing device is once operated from the forward running position to the neutral position. Especially, the second position of the fail-safe gear step switching valve held by the base pressure upon the failure occurrence is continuingly held. As a result, even if the shift changing device is operated after the failure occurrence from the forward running position via the neutral position to the forward running position again, the fail-safe gear step formerly established at the time when the failure occurred is established again.

The automatic transmission can have various structure such as planetary gear type multiple steps transmission which includes rotary elements of plural sets of planetary gear units, and plural hydraulic type frictionally engaging devices. The rotary elements are selectively brought into engaged state by plural hydraulic type frictionally engaging devices to establish plural gear steps for the speed-changing. The automatic transmission can be mounted onto the vehicle in some posture, which includes a lateral arrangement wherein an axis of the automatic transmission is directed in a width direction of the a front engine front drive type vehicle, and a longitudinal arrangement wherein the axis of the automatic transmission is directed in a front-rear direction of a front engine rear drive type vehicle. For the planetary gear type multiple steps transmission, various type multiple steps automatic transmissions can be listed, which includes a five steps for forward running, a six steps for forward running, and an eight steps for forward running.

As the hydraulic type frictionally engaging devices, a multiple discs type engaged by a hydraulic pressure actuator, a single disc type clutch or brake, or a belt type brake can be preferably employed. The hydraulic pressure pump or an oil pump supplying the operation oil pressure for bringing the hydraulic type frictionally engaging devices into the engaged state, may be driven for rotation by a power source for running including an internal combustion engine such as a gasoline engine or a diesel engine, or an electric motor, to output an operating hydraulic pressure i.e., an operation oil. In addition thereto or instead thereof, an electric motor disposed separately from the power source for running can be employed.

The hydraulic controlling apparatus including the hydraulic type frictionally engaging devices is preferably provided with, as the solenoid valve device, for example plural solenoid pressure regulation valves of which output hydraulic pressure is directly supplied to a hydraulic pressure actuator (hydraulic pressure) of the hydraulic type frictionally engaging devices for increase of the response. However, instead thereof, a shift control valve corresponding to each of the solenoid valves are provided so that an output hydraulic pressure thereof is used as a pilot hydraulic pressure for allowing the operation oil from the control valve to hydraulic pressure actuator. In such case only the pilot pressure being outputted, due to small oil amount of the control output, the linear solenoid can be made compact, compared to the case where the output hydraulic pressure is directly supplied to hydraulic type frictionally engaging device.

The plural linear solenoid valves can be provided in various modes. Preferably, they are provided for the plural hydraulic type frictionally engaging devices in one to one relation. However, for control of the plural hydraulic type frictionally engaging devices not engaged/released simultaneously, single linear solenoid valve common to them can be provide. Also, the hydraulic controlling of all the hydraulic type frictionally engaging devices is not essential, but the hydraulic controlling of some of or all of them can be performed by a pressure regulation method such as a duty-control of a on-off solenoid valve.

Incidentally, in this specification, term of "supply hydraulic pressure" is used to mean both "cause the hydraulic pressure to act" or "supply the operation oil controlled to the pressure".

PREFERRED EMBODIMENT OF THE INVENTION

Figures 1, 2:
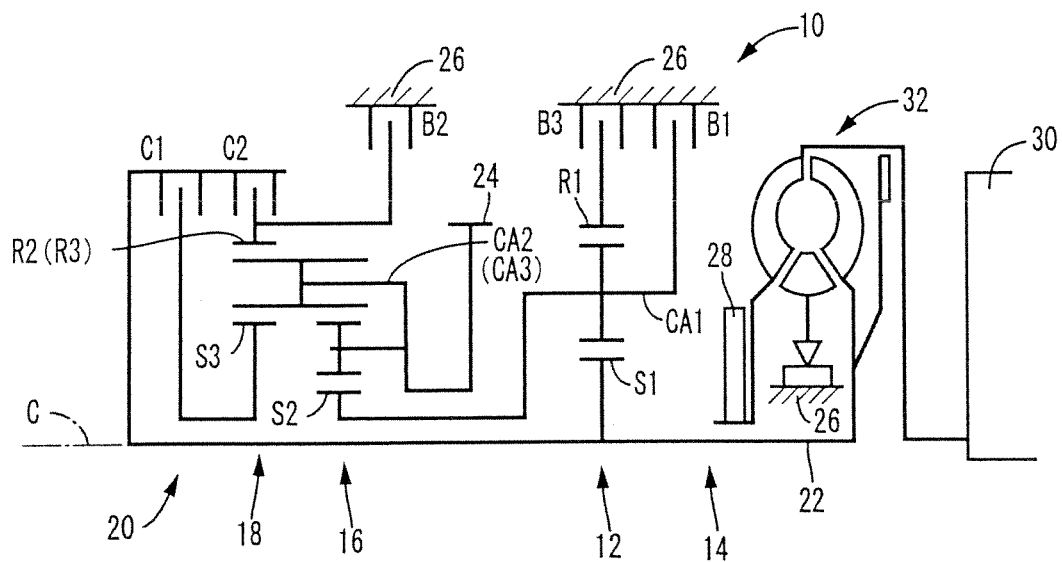
FIG. 1 is a framework view explaining structure of an automatic transmission for a vehicle to which the present invention is applied.
FIG. 2 is an engagement diagram explaining engaged state of frictionally engaging elements for establishing plural speed-change steps of the automatic transmission of FIG. 2.

In the following, an embodiment of the present invention will be explained with reference to attached drawing. FIG. 1 is a framework view explaining structure of an automatic transmission for vehicle (hereinafter briefly referred to an "automatic transmission") 10 to which the present invention is applied, and FIG. 2 is an operation table explaining frictionally engaging elements i.e., frictionally engaging devices for establishing plural speed-change steps. This transmission 10 is preferably mounted on a front engine, front drive type vehicle in a lateral direction i.e., right-left direction. In a transmission casing 26 as a non-rotatable member to be fixed to a vehicle body, a first speed-change part 14 and a second speed-change part 20 are mounted on a common shaft having a common axis C. The first speed-change part 14 is mainly comprised of a first planetary gear unit 12 of single pinion type, while the second speed-change part 20 has a predetermined type which is mainly comprised of a second planetary gear unit 16 of a double pinion type, and a third planetary gear unit 18 of a single pinion type. The transmission 10 speed-changes rotation of an input shaft 22 and then output the speed-changed rotation from an output rotation member 24.

The input shaft 22 corresponds to an input member of the transmission 10, and constructs in this embodiment a turbine shaft of an torque converter 32 as a hydrodynamic power transmitting apparatus driven by an engine 30 which is a power source for running. The output rotation member 24 corresponding to an output of the automatic transmission 10 functions as an output gear i.e., a differential driving gear to mesh with a differential driven gear (large diameter gear) 36 of an differential gear unit 34 shown in FIG. 3 for transmitting a power thereto. Output of the engine 30 is transmitted to a pair of driving wheels 40 via a torque converter 32, the automatic transmission 10, the differential gear unit 34, and a pair of axles 38. Incidentally, the automatic transmission 10 and the torque converter 32 are constructed symmetrically with respect to the axis C, and a lower half is omitted in the framework view of FIG. 1.

In the automatic transmission 10, any of rotary elements (sun gears S1 to S3, carriers CA1 to CA3, and ring gears R1 to R3) of the first speed-change part 14 and the second speed-change part 20 are connected with each other to establish a forward running speed-change step (gear step) and a rearward running speed-change step (gear step). The forward running speed-change step includes six gear step such as a first gear step "1st", a second gear step "2nd", a third gear step "3rd", a fourth gear step "4th", a fifth gear step "5th" and a sixth gear step "6th", while the rearward running speed-change step includes one gear step "R".

As shown in FIG. 2, the first gear step is established with engagement of a first clutch C1 and engagement of a second brake B2, the second gear step is established with engagement of the first clutch C1 and engagement of a first brake B1, the third gear step is established with engagement of the first clutch C1 and engagement of a third brake B3. The fourth gear step is established with engagement of the first clutch C1 and engagement of the second clutch C2, the fifth gear state is established with engagement of the second clutch C2 and engagement of a third brake B3, and the sixth gear step is established with engagement of the second clutch C2 and engagement of the first brake B1. One gear step "R" is established with engagement of the second brake B2 and engagement of the third brake B3. A neutral state is established with release of the first and second clutches C1 and C2, and release of the first, second and third brakes B1, B2 and B3.

The operation table shown in FIG. 2 summarizes relation between each of above speed-change step, and the operation states of the clutches C1 and C2, and the brakes B1 to B3, in which mark of ○ means the engagement of the clutches and the brakes, while no mark i.e., blank means release thereof. A speed-change ratio in each of the gear steps is determined by respective gear ratios (number of gears of sun gear/number of gears of ring gear) $\rho 1$, $\rho 2$ and $\rho 3$ of the first planetary gear unit 12, the second planetary gear unit 16 and the third planetary gear unit 18.

The above clutches and brakes are hydraulic type frictionally engaging elements to be controlled for engagement/release by a hydraulic actuator such as a multiple disc type clutch and brake. The engaged state and the released state of the clutches and the brakes are switched by energization, deenergization and current control of linear solenoid valves SLC1, SLC2, SLB1, SLB2 and SLB3 (refer to FIG. 5) as the solenoid valve device provided in a hydraulic controlling circuit 100 (FIG. 3) as the hydraulic controlling apparatus. Transitional hydraulic pressure upon engagement and release of the clutches and the braked is also controlled by the above solenoid valves SLC1, SLC2, SLB1, SLB2 and SLB3.

Figure 3:
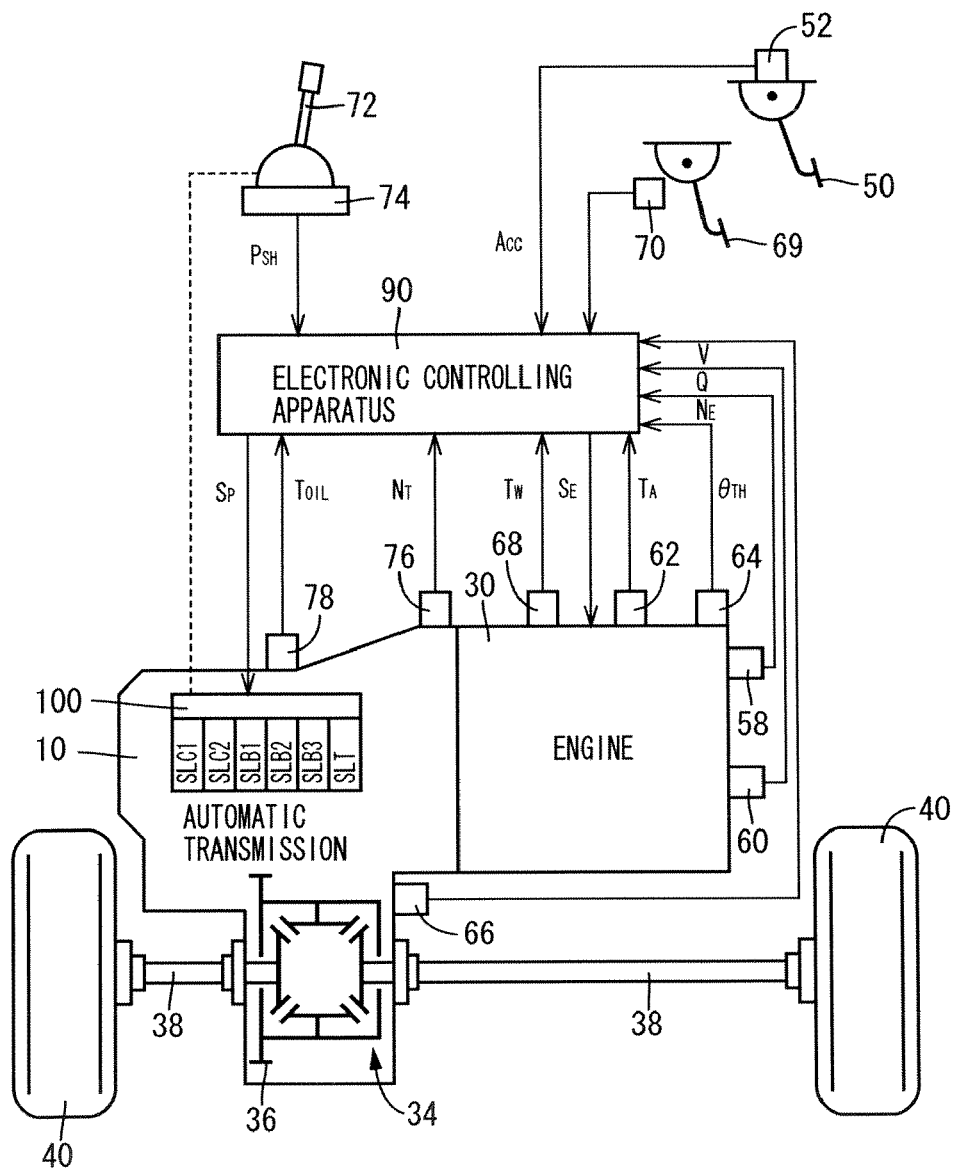
FIG. 3 is a block diagram explaining a main part of an electric control system provided in a vehicle for controlling the automatic transmission of FIG. 1.

FIG. 3 is a block diagram explaining a main part of an electric control system which is provided in the vehicle for controlling the automatic transmission 10 shown in FIG. 1 and the like, and which includes an electronic controlling apparatus 90. The electronic controlling apparatus 90 has so-called microcomputer provided with for example a CPU, a RAM, a ROM and an input/output interface. The CPU using a temporary memory function of the RAM performs a signal processing in accordance with a program stored in the ROM in advance to control output of the engine 30, to control the speed-change of the automatic transmission 10, and the like. If needed, the electronic controlling apparatus 90 can be divided into plural controlling part, such as an engine controlling part, and a speed-change controlling part for control of the linear solenoid valves SLC1, SLC2, SLB1, SLB2 and SLB3.

In FIG. 3, there are provided an accelerator operation amount sensor 52 for detecting an operation amount Acc of an accelerator pedal 50 known as so-called accelerator open-degree, an engine rotation speed sensor 58 for detecting a rotation speed $N_E$ of the engine 30, an inlet air amount sensor 60 for detecting an inlet air amount Q into the engine 30, inlet air temperature sensor 62 for detecting a temperature $T_A$ of the inlet air, a throttle valve open-degree sensor 64 for detecting an open-degree $\theta_{TH}$ of an electronic throttle valve, and a vehicle speed sensor 66 for detecting a vehicle speed V (corresponding to an output rotation speed $N_{OUT}$ of the output rotation member 24).

Also provided are a cooling water temperature sensor 68 for detecting a temperature $T_W$ of a cooling water for the engine 30, a brake switch 70 for detecting presence/absence of operation of a foot brake pedal 69 which is a usually operated pedal, a lever position sensor 74 for detecting a lever position (operated position) of a shift lever 72, a turbine rotation speed sensor for detecting rotation speed of a turbine shaft, and a AT oil temperature sensor 78 for detecting temperature of a AT oil.

From these sensors and the switch, signals are supplied to the electronic controlling apparatus 90, which respectively represent an accelerator operation amount (accelerator open-degree) Acc, an engine rotation speed $N_E$, an inlet air amount Q, an inlet air temperature $T_A$, a throttle open-degree $\theta_{TH}$, a vehicle speed V, an output rotation speed $N_{OUT}$, an engine cooling water temperature $T_W$, a presence/absence of brake operation, a lever position $P_{SH}$ of the shift lever 72, a turbine rotation speed $N_T$ (input shaft rotation speed $N_{IN}$), and a AT oil temperature $T_{OIL}$.

From the electronic controlling apparatus 90, an engine output control command signal $S_E$ for an output control of the engine 30 is outputted, which includes a drive signal, an injection signal and an ignition signal. The drive signal drives a throttle actuator to open/close the electronic throttle valve in accordance with the accelerator operation amount Ace, the injection signal controls amount of the fuel injected from the injection device, and the ignition signal control the liming of the fuel/air mixture by the ignition device. Also outputted from the electronic controlling apparatus 90 is a speed-change control command signal $S_P$, which includes a control signal and a drive signal. The control signal controls operation of the linear solenoid valves SLC1, SLC2, SLB1, SLB2 and SLB3 provided in the hydraulic controlling circuit 100 which switches the speed-change steps of the automatic transmission 10, and the drive signal drives the linear solenoid valve SLT as the solenoid valve device for controlling a line hydraulic pressure $P_L$.

Figure 4:
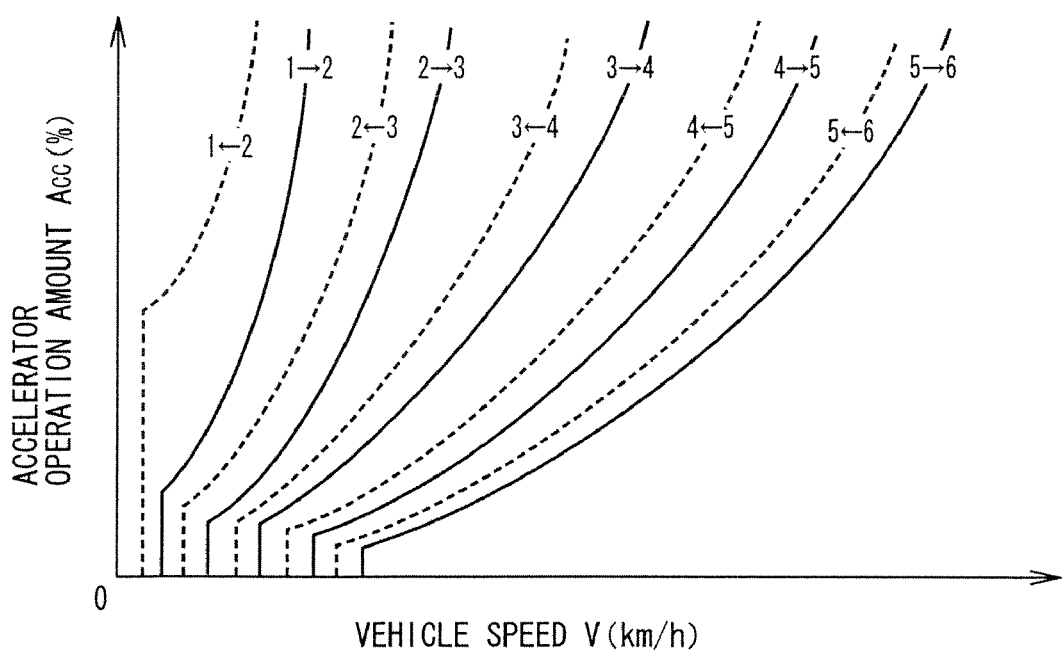
FIG. 4 is a view showing one example of a speed-change diagram (map) used in a speed-change control of the automatic transmission performed by an electronic controlling apparatus of FIG. 3.

Next, the speed-change control by the electronic controlling apparatus 90 will be explained in detail. The electronic controlling apparatus 90 uses, for example, a relation (map, speed-change diagram) shown in FIG. 4 stored in advance with the vehicle speed V and the accelerator operation amount Acc being variables. Based on the actual vehicle speed V and the actual accelerator operation amount Acc, the electronic controlling apparatus 90 judges necessity of the speed-change by the automatic transmission 10, for example, the speed-change step of the automatic transmission 10 to be speed changed. For such automatic speed-change control, the electronic controlling apparatus 90 has a speed-change controlling means for controlling the automatic transmission 10.

Here, the electronic controlling apparatus 90 outputs the command to the hydraulic controlling circuit 100 to engage or release the hydraulic type frictionally engaging devices relating to the speed-change by the automatic transmission 10 so that speed-change is performed in accordance with the operation table shown in FIG. 2. Specifically, any of the linear solenoid valves SLC1, SLC2, SLB1, SLB2 and SLB3 in the hydraulic controlling circuit 100 are energized or deenergized to control the hydraulic pressure supplied to hydraulic actuators of the hydraulic frictionally engaging devices such as the clutches C1 and C2, and the brakes B1 to B3.

A shift lever 72 is a shift switching device for switching a power transmitting route in the automatic transmission 10, and is provided in the vicinity of the driver's seat. It is manually shifted to one of four positions, shown in FIG. 5, including "T (parking)" position, "R (reverse)" position, "N (neutral)" position, and "(drive)" position. The "T" position (range) is the parking position where constructive components of the automatic transmission 10 are brought into a neutral state and the power transmitting route therein released, that is, the power transmitting is interrupted, and rotation of the output rotation member 24 is mechanically locked by a parking mechanism. The "R" position is the rearward running position for rotating the output rotation shaft 24 reversely, and the "N" position is the neutral position for interrupting the power transmitting in the automatic transmission 10. The "D" position is a forward running position for establishing the automatic speed-change within the speed-change range which allows the speed-change from the first gear step to the sixth gear step of the automatic transmission 10. With this, using all of the gear steps of the first gear step "1st" to the sixth gear step "6th" the automatic speed-change is performed.

Figure 5:
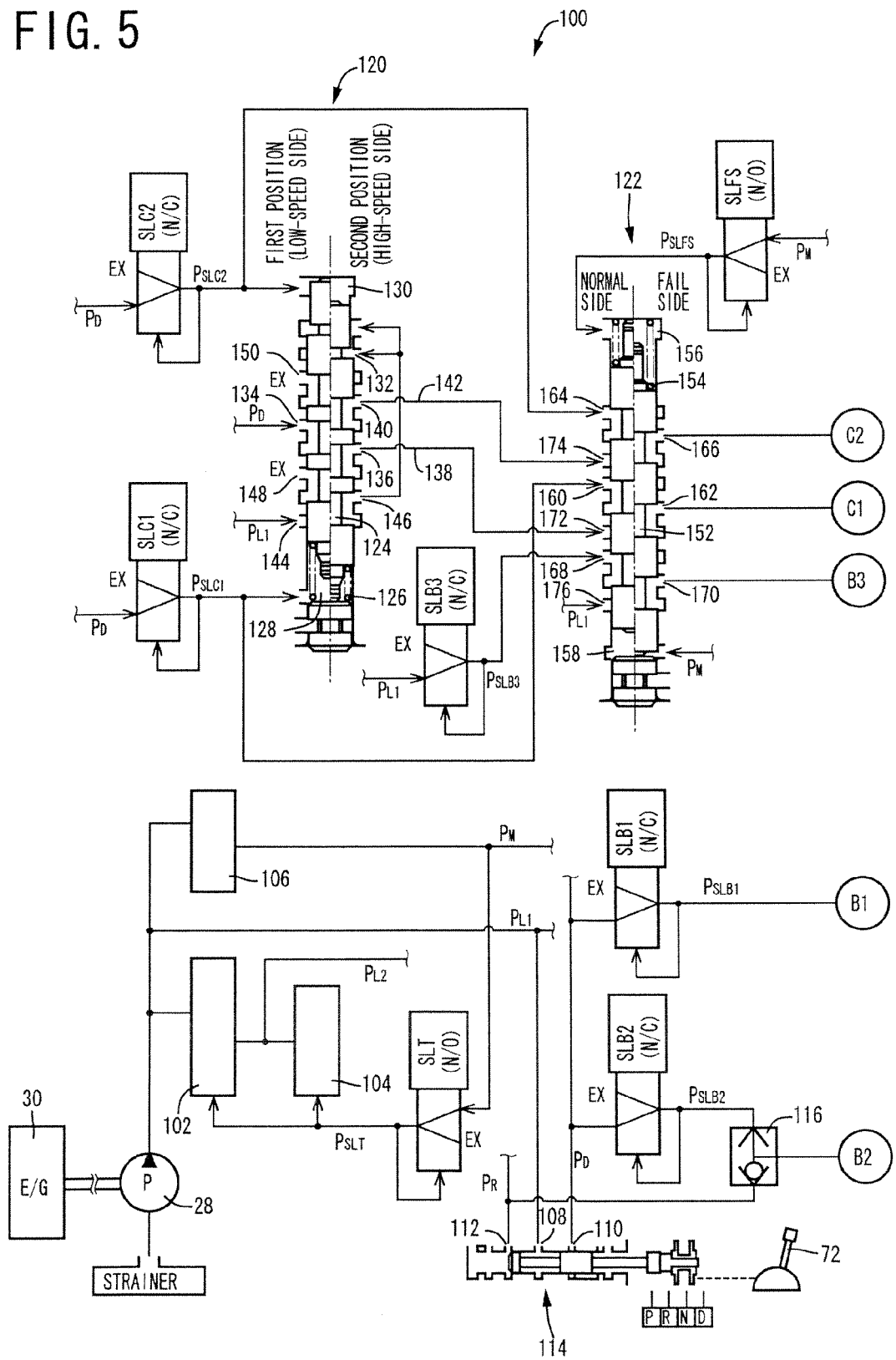
FIG. 5 is a circuit diagram explaining, of a hydraulic controlling apparatus, a main part for controlling engagement/release of clutches and brakes controlling speed-change of the automatic transmission.

FIG. 5 is a circuit view explaining structure of a main part of the hydraulic controlling circuit 100 which controls engagement/release of the clutches C1 and C2, and the brakes B1 to B3 for the speed-changing by the automatic transmission 10. As shown in FIG. 5, the hydraulic controlling circuit 100 is comprised of a pressure regulator valve 102, a pressure regulator valve 104 and the like for controlling engagement/release of the brakes B1 and B2, and a linear solenoid valve SLC1, a linear solenoid valve SLC2, a linear solenoid valve SLB3 and the like for controlling engagement/release of the clutches C1 and C2, and the Brake B3.

The first regulator valve (first pressure regulation valve) 102 pressure-regulates a line hydraulic pressure (first line hydraulic pressure $P_{L1}$), based on the operation oil pressure outputted (generated) by a mechanical oil pump 28 (refer to FIG. 1) driven by the engine 30. The second regulator valve 104 (second pressure regulation valve) pressure-regulates a line hydraulic pressure (second line hydraulic pressure i.e., second pressure $P_{L2}$) based on the hydraulic pressure discharged from the first regulator valve 102 for pressure regulation of the line hydraulic pressure $P_{L1}$ by the first regulator valve 102. The modulator valve 106 pressure-regulates a modulator pressure $P_M$ in a constant value based on the line hydraulic pressure $P_{L1}$.

A linear solenoid valve SLT supplies a signal pressure $P_{SLT}$ to both the first regulator valve 102 and the second regulator valve 104 based on the modulator hydraulic pressure $P_M$ so that the line hydraulic pressures $P_{L1}$ and $P_{L2}$ are regulated to the values corresponding to the engine load. In a manual valve 114, the line hydraulic pressure $P_{L1}$ is inputted into an input port 108 thereof, and the shift lever 72 is mechanically connected thereto by a cable or a link. When the shift lever 72 is shifted to the "D" position for switching a valve position of the manual valve 114, the manual valve 114 outputs the line hydraulic pressure $P_{L1}$ as a hydraulic pressure for forward running i.e., a D-range pressure $P_D$ from an output port 110. When the shift lever 72 is shifted to the "R" position for switching the valve position of the manual valve 114, the manual valve 114 outputs the line hydraulic pressure $P_{L1}$ as a hydraulic pressure for rearward running i.e., a reverse pressure $P_R$ from an output port 112. In this way, the line hydraulic pressures $P_{L1}$ and $P_{L2}$, the modulator pressure $P_M$, the D-range pressure $P_D$ and the R-range pressure $P_R$ are supplied to various parts, for example, the linear solenoid valves SLC1, SLC2, SLB1, SLB2 and SLB3 provided in the hydraulic controlling circuit 100.

The line hydraulic pressures $P_{L1}$ and $P_{L2}$ and the modulator pressure $P_M$ based on pressure of the operation oil outputted from the oil pump 28 is the base pressure not depending on the valve position of the manual valve 114. This base pressure is, after pressure regulated by the first pressure regulator valve 102, the second pressure regulator valve 104 and the modulator valve 106, directly supplied various parts in the hydraulic controlling circuit 100.

The linear solenoid valves SLC1, SLC2, SLB1, SLB2 and SLB3 are constructed in oil paths thereof to independently control engagement/release of the clutches C1 and C2, and the brakes B1 to B3. In detail, the solenoid valve SLC1 of the second part B operates to supply the hydraulic pressure (control pressure $P_{SLC1}$) to the clutch C1 based on the D-range pressure $P_D$, and the solenoid valve SLC2 of the second part B operates to supply the hydraulic pressure (control pressure $P_{SLC2}$) to the clutch C2 based on the D-range pressure $P_D$. The solenoid valve SLB1 of the first part A operates to supply the hydraulic pressure (control pressure $P_{SLB1}$) to the brake B1 based on the D-range pressure $P_D$, the solenoid valve SLB2 operates to supply the hydraulic pressure (control pressure $P_{SLB2}$) to the brake B2 based on the D-range pressure $P_D$, and the solenoid valve SLB3 of the second part B operates to supply the hydraulic pressure (control pressure $P_{SLB3}$) to the brake B3 based on the line pressure $P_{L1}$.

These linear solenoid valves SLC1, SLC2, SLB1, SLB2 and SLB3 are the solenoid valve of substantially the same structure, and are independently controlled by the electronic controlling apparatus 90 to be energized or deenergized. In the energized state (on state) they are brought into an open state to output the pressurized operation oil i.e., hydraulic pressure, while in the deenergized state (off state) they are brought into a close state not to output the pressurized operation oil i.e., hydraulic pressure. Thus, these linear solenoid valves SLC1 and the like are normally-closed type linear solenoid valves (solenoid pressure-regulation valve).

As shown in the operation table of FIG. 2, the linear solenoid valve SLC1 operates as the first solenoid pressure regulation valve to output the control pressure $P_{SLC1}$ to the clutch C1 which is one of the two hydraulic type frictionally engaging devices. The linear solenoid valve SLC2 operates as the second solenoid pressure regulation valve to output the control pressure $P_{SLC2}$ to the clutch C2 which is one of the two hydraulic type frictionally engaging devices. In detail, the clutch C1 operates to establish the first gear step to the fourth gear step as the low-speed side gear step, including the first gear step which is the lowest-speed gear step, and the clutch C2 operates to establish the fifth gear step and the sixth step as the high-speed side gear step, including the sixth gear step being the highest-speed gear step.

The hydraulic controlling circuit 100 has a shuttle valve 116 connected to the brake B2 to selectively output the control pressure $P_{SLB2}$ or the reverse pressure $P_R$ of the linear solenoid valve SLB2 thereto.

Next a part relating to the fail-safe mechanism will be explained. Such fail-safe mechanism is preferably employed for securing the vehicle running, even when the predetermined signals are not sent from the electronic controlling apparatus 90 to the hydraulic controlling circuit 100 due to any cause therebetween. Specifically, an electric connection between the electronic controlling apparatus 90 and the hydraulic controlling circuit 100 may be disconnected due to malfunction of a wiring connecting them each other, or disengagement of a connector connecting them each other. Such wiring malfunction and the like causes a failure state of the solenoid valve device such as the linear solenoid valves SLC1, SLC2, SLB3 and the like, in which the predetermined signals such as the speed-change control signal $S_P$ and the like do not reach to any of the linear solenoid valves SLC1, SLC2, SLB1, SLB2 and SLB3, so that all them are brought into a non-operating state (all failure state).

Even under such all fail state, i.e., all the linear solenoid valves being off, the fail-safe mechanism establishes two fail-safe gear steps including a predetermined low-speed side gear step and a high-speed side gear step, for allowing the vehicle running.

The hydraulic controlling circuit 100 employs, for establishing the fail-safe gear step upon failure state of the solenoid valve device (in this embodiment, especially linear solenoid valves SLC1, SLC2, SLB3), a fail-safe gear step switching valve 120, a normal/failure switching valve 122, and a linear solenoid valve SLFS as the solenoid valve device. The linear solenoid valve SLFS supplies the hydraulic pressure (control pressure $P_{SLSF}$) to the normal/failure switching valve 122 based on the modulation hydraulic pressure $P_M$.

Specifically, the fail-safe gear switching valve 120 is provided with a spool 124, a spring 126, a chamber 128, a chamber 130 and a diameter different portion 132. The spring 126 is disposed at one axial end of the spool 124 to apply a propel force to the spool 124 toward a low-speed position (upper position in FIG. 5). The chamber 128 containing the spring 126 therein receives the control pressure $P_{SLC1}$ to bias the spool 124 toward the low-speed position, and the oil chamber 130 formed at other axial end of the spool 124 receives the control pressure $P_{SLC2}$ to bias the spool 124 toward the high-speed position (lower position if FIG. 5). The diameter difference portion 132 is formed near the other end of the spool 124 and functions as an oil chamber which receives the line hydraulic pressure $P_{L1}$ as the predetermined hydraulic pressure to bias the spool 124 toward the high-speed side.

In the fail-safe gear step switching valve 120, when the vehicle is running in one of the first gear step to the forth gear step with the shift lever being in the "D" position, the control pressure $P_{SLC1}$ outputted from the linear solenoid valve SLC1 for establishment of the low-speed side gear step (left half in FIG. 5) shifts i.e., switches the spool 124 toward the low-speed side. As a result, the D-range pressure $P_D$ supplied to the input port 134 is supplied to the first oil path 138 from the output port 136. Incidentally, during the vehicle running with fourth gear step, because of both the control pressure $P_{SLC1}$ and the control pressure $P_{SLC2}$ outputted from the linear solenoid valve SLC2 being respectively inputted, the spool 124 is switched to the low-speed side by bias force of the spring 126.

That is, the valve (operation) position of the fail-safe gear step switching valve 120 is switched based on the control pressure $P_{SLC1}$ to a first position, where the D-range pressure $P_D$ is supplied to the first oil path 138. Even when the solenoid valve device (for example linear solenoid valve SLC1) turns to the failure state in the first position of the fail-safe gear step switching valve 120, that is, during the vehicle running, with any of the first gear step to the fourth gear step with "D" position, on account of the spool 124 remained at the low-speed side position by the spring 126, the fail-safe gear step switching valve 120 remains or memorizes the first position.

When the vehicle is running in the fifth gear step or the sixth gear step with the shift lever being in the "D" position, the control pressure $P_{SLC2}$ outputted for establishment of the high-speed side gear step shifts or switches the spool 124 toward the high-speed side (refer to right half of FIG. 5). As a result, the D-range pressure $P_D$ supplied to the input port 134 is supplied to a second oil path 142 from the output port 140. The line hydraulic pressure $P_{L1}$ supplied to an input port 144 is supplied to the diameter different portion 132 via a relay path 146.

That is, the valve position of the fail-safe gear step switching valve 120 is switched based on the control pressure $P_{SLC2}$ to a second position, where the D-range pressure $P_D$ is supplied to the second oil path 144. Even when the solenoid valve device (for example, linear solenoid valve SLC2) turned the failure state in the first position of the fail-safe gear step switching valve 120, that is, during the vehicle running, with the fifth gear step or the sixth gear step with "D" position, on account of the spool 124 remains at the high-speed side position by the line hydraulic pressure $P_{L1}$ in the diameter difference portion 132, the fail-safe gear step switching valve 120 remains or memorizes the second position. Noted that this state is released by introduction of the control pressure $P_{SLC1}$ for establishing the low-speed side gear step.

The spool 124 is maintained at the second position until it is switched or shifted to the low-speed side by one of the following two operations. One operation is supplying of the control pressure $P_{SLC1}$ to switch the spool 124 to the low-speed side. Other operation is related to drop or shut-off of the line hydraulic pressure $P_{L1}$ and bias force by the spring 126 resulted from the turn-off of the ignition performed upon failure state of the solenoid valve device (linear solenoid valves SLC1, SLC2, SLB3). In this case, the spool 124 is shifted to the low-speed side by bias force of the spring 126. In detail, shifting of the spool 124 to the low-speed side shifts the fail-safe gear step switching valve 120 to the first position, so that the line hydraulic pressure $P_{L1}$ inputted into the diameter different portion 132 is discharged from an discharge port (EX) via the relay port 146.

In this way, the valve position of the fail-safe gear step switching valve 120 is switched to assume the first position or the second position in the alternative way. In addition, upon the failure state of the solenoid valve device (linear solenoid valves SLC1, SLC2, SLB3), the spool 124 remains at the first position regardless of supplying of the hydraulic pressure $P_{L1}$, and maintains the valve position at the time when the solenoid valve device turned to the failure state, that is at the time just before failure state occurred so that the second position is maintained based on the line hydraulic pressure $P_{L1}$.

Changing the viewpoint, the state where the second position being maintained and the state where the first position being maintained can be maintained, even after shifting of the shift lever 72 from the "D" position to the "N" position, that is after drop of the D-range pressure $P_D$ resulted from a D→N shifting. For this reason, when the shift lever 72 is shifted to the "D" position again after the D→N shifting, that is, when a D→N→D shifting is performed, position of the spool 124 at the "D" position before the D→N shifting is maintained.

Incidentally, in the above fail-safe gear step switching valve 120, the D-range pressure $P_D$ outputted to the first oil path 138 is discharged via the output port 136 from a discharge port 148, and the D-range pressure $P_D$ outputted to the second oil path 142 is discharged via the output port 140 from a discharge port 150

The normal/failure switching valve 122 is provided with a spool 152, a spring 154, a chamber 156 and a chamber 158. The spring 154 is disposed at one axial end of the spool 152 to apply to the spool 152 a propel force toward a failure side position (refer to a right half of the normal/failure switching valve 122 of FIG. 5). The chamber 156 containing the spring 154 therein receives the control pressure $P_{SLFS}$ to bias the spool 152 toward the failure side position, and the oil chamber 158 formed at other axial end of the spool 152 receives the modulation pressure $P_M$ to bias the spool 152 toward the normal side position (refer to a left half of the normal/failure switching valve 122 of FIG. 5). The normal/failure switching valve 122 further includes input ports 160, 164 and 168 to which hydraulic pressure is supplied upon the normal state, input ports 172, 174 and 176 to which hydraulic pressure is supplied upon the failure state, and output ports 162, 166 and 170 respectively connected to the input port 160 or 172, input port 164 or 174, input port 168 or 176.

The linear solenoid valve SLFS is controlled independently by the electronic controlling apparatus 90 to be energized or deenergized. In the deenergized state (off state), it is brought into an open state to output the pressurized operation oil, while in the energized state (on state) it is brought into a close state not to output the pressurize operation oil. Thus, this solenoid valve SLFS is normally-opened type solenoid valve. In the failure state of the solenoid valve device (linear solenoid valves SLC1, SLC2, SLB3), similar to the linear solenoid valves SLC1, SLC2, SLB1, SLB2 and SLB3, the linear solenoid valve SLFS is also deenergized and output the modulation pressure $P_M$ as it is, as the control pressure $P_{SLFS}$.

On the other hand, in the normal state of the solenoid valve device (linear solenoid valves SLC1, SLC2, SLB3) in which the linear solenoid valves SLC1, SLC2, SLB1, SLB2 and SLB3 are operable, the linear solenoid valve SLFS is brought into the energized state and outputs the predetermined control pressure $P_{SLFS}$ of which value is selected so that sum of the bias force resulted from the control pressure $P_{SLFS}$ and the bias force by the spring 154 does not exceed the bias force resulted from the modulate hydraulic pressure $P_M$. For example, the linear solenoid valve SLFS outputs the control pressure $P_{SLFS}$ in the range from 0 to 80% of the modulation pressure $P_M$ upon the normal state.

The normal/failure switching valve 122 and the linear solenoid valve SLFS operate as follow. In the normal state of the solenoid valve device (linear solenoid valves SLC1, SLC2, SLB3), the spool 154 is shifted to the normal side position by the force relation among the modulation pressure $P_M$, the control pressure $P_{SLFS}$ upon normal state, and bias force by the spring 154. As a result, the input port 160 into which the control pressure $P_{SLFS}$ is inputted and the supply port 162 connected to the oil path to the clutch C1 are communicated with each other, the input port 164 into which the control pressure $P_{SLC1}$ is inputted and the supply port 166 connected to the oil path to the clutch C2 are communicated with each other, and the input port 168 into which the control pressure $P_{SLC2}$ is inputted and the supply port 170 connected to the oil path to the brake B3 are communicated with each other.

That is, the oil paths in the normal/failure switching valve 122 are so constructed that the linear solenoid valves SLC1, SLC2 and SLB3 are respectively connected to the clutch C1, the clutch C2 and the brake B3. For this reason, the normal/failure switching valve 122 upon the normal state of the solenoid valve device (linear solenoid valves SLC1, SLC2, SLB3) allows the control pressure $P_{SLC1}$ to be supplied to the clutch C1, the control pressure $P_{SLC2}$ to be supplied to the clutch C2. Also, it allows the control pressure $P_{SLB3}$ of the linear solenoid valve SLB3 which is the third solenoid pressure regulation valve to be supplied to the brake B3 for establishing the third gear step and the fifth gear step.

In the failure state of the solenoid valve device (linear solenoid valves SLC1, SLC2, SLB3), the spool 154 is shifted to the failure side position by the force relation among the modulation pressure $P_M$, the control pressure $P_{SLFS}$ under failure state (i.e., modulation hydraulic pressure $P_M$) and bias force by the spring 154. As a result, the input port 172 connected to the first oil path 138 and the supply port 162 are communicated, the input port 174 connected to the second oil path 142 and the supply port 166 are communicated, and the input port 176 into which the line hydraulic pressure oil $P_{L1}$ is inputted and the supply port 170 are communicated, respectively with each other.

That is, the oil paths in the normal/failure switching valve 122 are so constructed that the D-range pressure $P_D$ and the line hydraulic pressure $P_{L1}$ are respectively supplied to the clutch C1, the clutch C2 and the brake B3. For this reason, the spool 154 shifts from the normal side position to the failure side position upon failure state of the solenoid valve device, and allows the D-range pressure $P_D$ from the fail-safe gear step switching valve 120 to be supplied to supply the clutch C1, the D-range pressure $P_D$ outputted from the second oil path 142 to be supplied to the clutch C2, and the line hydraulic pressure $P_{L1}$ to be supplied to the brake B3.

In this way, the normal/failure switching valve 122 switches the valve position of the spool 152 depending on the normal state and the failure state of the solenoid switching valve device (linear solenoid valves SLC1, SLC2, SLB3). In the normal state, the clutch C1 and clutch C2, and the brake B3 are respectively engaged or released by the linear solenoid valves SLC1, SLC2 and SLB3, while in the failure state the clutch C1 and clutch C2, and the brake B3 are respectively engaged or released by the D-range pressure $P_D$ and the line hydraulic pressure $P_{L1}$ which are supplied even under failure state of the solenoid valve device.

In the hydraulic controlling circuit 100 thus constructed, as the fail-safe mechanism for the failure state of the solenoid valve device (linear solenoid valves SLC1, SLC2, SLB3), two kinds of fail-safe gear steps for the automatic transmission 10 are established. The first kind is establishment of the third gear step as the low-speed side gear step of the low-speed side gear steps, which is established by engagement of the clutch C1 as the first hydraulic type frictionally engaging device and the brake B3 as the third hydraulic type frictionally engaging device. The second kind is establishment of the fifth gear step as the high-speed side gear step of the high-speed side gear steps, which is established by engagement of the clutch C2 and the brake B3 as the second hydraulic type frictionally engaging device.

That is, the hydraulic controlling circuit 100 includes the fail-safe gear step switching valve 120 which is maintained, in the normal state of the solenoid valve device (linear solenoid valves SLC1, SLC2, SLB3), in the first position for establishment of the low-speed side gear step based on the control pressure $P_{SLC1}$ just before occurrence of failure, or the second position for establishment of the high-speed side gear step based on the control pressure $P_{SLC2}$ just before occurrence of failure. This is for selecting the third gear step as the fail-safe gear step of low-speed side, and the fifth gear step as the fail-safe gear step of the high-speed side both set in advance among plural gear steps of the automatic transmission 10, in the alternative way. The fall-safe gear step switching valve 120 outputs the D-range pressure $P_D$ in the first position of the spool 124 to the first oil path 138 i.e., the clutch C1, and outputs the D-range pressure $P_D$ in the second position of the spool 124 to the second oil path 142 i.e., the clutch C2.

More specifically, the speed-change control to establish the third gear step in the normal state of the solenoid valve device (linear solenoid valves SLC1, SLC2, SLB3) is performed as follow. The linear solenoid valves SLC1 and SLB3 respectively correspond to the clutch C1 and the brake B3 are energized to output the control pressure $P_{SLC1}$ and the control pressure $P_{SLB3}$. The control pressure $P_{SLC1}$ is inputted to the input port 160 of the normal/failure switching valve 122 switched to the normal side position, and then is supplied from a supply port 162 to the clutch C1 for engagement thereof Simultaneously, the control pressure $P_{SLB3}$ inputted to the input port 168 is supplied from a supply port 170 to the brake B3 for engagement thereof Thus, the third gear step which is one of the low-speed side gear step is established.

Also, the speed-change control to establish the fifth gear step in the normal state of the solenoid valve device (linear solenoid valves SLC1, SLC2, SLB3) will be explained. The linear solenoid valves SLC2 and SLB3 respectively correspond to the clutch C2 and the brake B3 are energized to output the control pressure $P_{SLC2}$ and the control pressure $P_{SLB3}$. The control pressure $P_{SLC2}$ is inputted to the input port 164 of the normal/failure switching valve 122 switched to the normal side position, and then is supplied from a supply port 166 to the clutch C2 for engagement thereof Simultaneously, the control pressure $P_{SLB3}$ inputted to the input port 168 is supplied from a supply port 170 to the brake B3 for engagement thereof. Thus, the fifth gear step which is one of the high-speed side gear step is established.

As mentioned above, in the normal sate, the third gear step or the fifth gear step is established regardless of position of the spool 124 by energization or deegergization of the linear solenoid valves SLC1 and SLC2.

Next, operation of the fail-safe mechanism will be explained, according to the vehicle state type just before occurrence of the failure state of the solenoid valve device (linear solenoid valves SLC1, SLC2, SLB3), that is, vehicle running in the low-speed side gear step and vehicle running in the high-speed side gear step.

When the solenoid valve device (linear solenoid valves SLC1, SLC2, SLB3) turns to the failure state during the vehicle running with the "D" position in one of the first gear step to the fourth gear step, position of the spool 124 of the fail-safe gear step switching valve 120 is maintained at the first position (low-speed side position) where it was positioned till then, while position of the spool 152 of the normal/failure switching valve 122 is switched from the normal side position to the failure side position. In this state, the D-range pressure $P_D$ inputted to the input port 134 of the fail-safe gear step switching valve 120 is, via the output port 136 and the first oil path 138, inputted to the input port 172 of the normal/failure switching valve 122, and then is supplied via the supply port 162 to the clutch C1 for engagement thereof. Simultaneously, the line hydraulic pressure $P_{L1}$ inputted to the input port 176 of the normal/failure switching valve 122 is supplied via the supply port 170 to the brake B3 for engagement thereof.

With this, the third gear step is established as the fail-safe gear step to allow the continuing vehicle running. In addition, the speed-change from the low-speed side gear step to the third gear step, different from the case the high-speed side gear step being uniformly set as the fail-safe gear step, can avoid a quick speed-change or lack of the driving force, whereby suitable vehicle running can be secured even after solenoid valve device turns to the failure state.

When the solenoid valve device (linear solenoid valves SLC1, SLC2, SLB3) turns to the failure state during the vehicle running with the "D" position in the fifth gear step or the sixth gear step, position of the spool 124 of the fail-safe gear step switching valve 120 is maintained at the second position (high-speed side position) where it was positioned till then, while position of the spool 152 of the normal/failure switching valve 122 is switched from the normal side position to the failure side position. In this state, the D-range pressure $P_D$ inputted to the input port 134 of the fail-safe gear step switching valve 120 is, via the output port 140 and the second oil path 142, inputted to the input port 174 of the normal/failure switching valve 122, and then is supplied via the supply port 166 to the clutch C2 for engagement thereof. Simultaneously, the line hydraulic pressure $P_{L1}$ inputted to the input port 176 of the normal/failure switching valve 122 is supplied via the supply port 170 to the brake B3 for engagement thereof.

With this, the fifth gear step is established as the fail-safe gear step to allow the continuing vehicle running. In addition, the speed-change from the high-speed side gear step to the fifth gear step, different from the case the low-speed side gear step being uniformly set as the fail-safe gear step, can avoid a quick speed-change or a sense of incongruity by the driver during high-speed running. Such sense is caused by rotation speed $N_E$ of the engine exceeding the excessive rotation area, or action of the strong engine brake. As a result, suitable vehicle running can be secured even after solenoid valve device (linear solenoid valves SLC1, SLC2, SLB3) turns to the failure state.

Next explained is a relation between the gear step and the shifting of the shift lever 72 from "D" position to "N" position and the like. As mentioned above, shifting of the shift lever 72 to the "N" position interrupts the power transmitting route and the line hydraulic pressure $P_{L1}$ is supplied. When the above fail-safe gear step is established in the vehicle running with "D" position due to the failure state of the solenoid valve device (linear solenoid valves SLC1, SLC2, SLB3), even if the D→N operation of the shift lever 72 is performed, the spool 124 of the fail-safe gear step switching valve 120 is continuingly maintained at the first position by bias force of the spring 126 or the line hydraulic pressure $P_{L1}$. Accordingly, when the D→N→D operation is performed, the fail-safe gear step established in the "D" position before the D→N→D operation, that is, the fail-safe gear step established at the time when failure of the solenoid valve device occurred, is established again.

In detail, during the vehicle running in which the third gear step is established as the fail-safe gear shift, when the D→N→D operation is performed, the third gear step is established again. In other words, the fifth gear step is not established as the fail-safe gear step even in the D→N→D operation, so that lack of the driving force is avoided to secure suitable vehicle running after the D→N→D operation.

Also, during the vehicle running in which the fifth gear step is established as the fail-safe gear shift, when the D→N→D operation is performed, the fifth gear step is established again. In other words, the third gear step is not established as the fail-safe gear step even in the D→N→D operation, so that the sense of incongruity by driver is avoided to secure suitable vehicle running after the D→N→D operation.

The case of the ignition being turn off after establishment of the fail-safe gear step will be explained. Such case may occur where the vehicle running under establishment of the fail-safe gear step due to failure of the solenoid valve device (linear solenoid valves SLC1, SLC2, SLB3) with the "D" position stops and the ignition is turned off. In this case, the line hydraulic pressure $P_{L1}$ drops and maintenance of the valve position is reset. That is, position of the spool 124 of the fail-safe gear step switching valve 120 is set to the initial position i.e., the first position by the bias force of the spring 126. The ignition is turned after turn off thereof and the shift lever 72 is shifted to the "D" position, whereby the third gear step is established as the fail-safe gear step, similar to the case the solenoid valve device turns to failure state during the vehicle running in one of the first gear step to the fourth gear step.

That is, regardless of the fail-safe gear step (the third gear step or the fifth gear step), at the time when the solenoid valve device turns to failure state, the third gear step is uniformly established. Accordingly, different from the case the high-speed gear step being uniformly established as the fail-safe gear step, the driving force required in the vehicle starting and the low-speed running can be secured to allow the vehicle running after stoppage.

When the solenoid valve device (linear solenoid valves SLC1, SLC2, SLB3) turns to failure state during turn off of the ignition, the spool 124 of the fail-safe gear step switching valve 120 is switched to the first position, so that the third gear step is established as the fail-safe gear step upon turn on of the ignition. Thus, the driving force required for the vehicle starting and the low-speed running can be secured.

Operation of this embodiment can be summarized as below.

(1) Normal State of Solenoid Valve Device (i) Low-Speed Vehicle Running

The fail-safe gear step switching valve 120 is in the first position and the normal/failure switching valve 122 is in the normal side position. The control pressure $P_{SLC1}$ outputted from the linear solenoid valve SLC1 is inputted, not via the fail-safe gear step switching valve 120, to the input port 160 of the normal/failure switching valve 122, and then is outputted from the output port 162 to the clutch C1. Simultaneously, the control pressure PS 33 outputted from the linear solenoid valve SLB3 is inputted to the input port 168 of the normal/failure switching valve 122, and then is outputted from the output port 170 to the brake B3. Thus, the third gear step is established.

(ii) High-Speed Vehicle Running

The fail-safe gear step switching valve 120 is in the second position and the normal/failure switching valve 122 is in the normal side position. The control pressure $P_{SLC2}$ outputted from the linear solenoid valve SLC2 is inputted, not via the fail-safe gear step switching valve 122, to the input port 164 of the normal/failure switching valve 122, and then is outputted from the output port 166 to the clutch C2. Simultaneously, the control pressure $P_{SLB3}$ outputted from the linear solenoid valve SLB3 is inputted to the input port 168 of the normal/failure switching valve 122, and then is outputted from the output port 170 to the brake B3. Thus, the fifth gear step is established.

(2) Failure State of Solenoid Valve Device (i) Low-Speed Vehicle Running

The fail-safe gear step switching valve 120 is in the low-speed side position, and the normal/failure switching valve 122 is in the fail side position. The D-range pressure $P_D$ inputted to the fail-safe gear step switching valve 120 is inputted, via the first oil path 138, to the input port 172 of the normal/failure switching valve 122, and then is outputted from the output port 162 to the clutch C1. Simultaneously, the line hydraulic pressure $P_{L1}$ in inputted to the input port 176 of the normal/failure switching valve 122 and then is outputted from the output port 170 to the brake B3. Thus, the third gear step is established.

(ii) High Speed Vehicle Running

The fail-safe gear step switching valve 120 is in the high-speed side position, and the normal/failure switching valve 122 is in the fail side position. The hydraulic line pressure $P_{L1}$ inputted to the fail-safe gear step switching valve 120 is inputted, via the second oil path 142, to the input port 174 of the normal/failure switching valve 122, and then is outputted from the output port 166 to the clutch C1. Simultaneously, the line hydraulic pressure $P_{L1}$ in inputted to the input port of the normal/failure switching valve 122 and then is outputted from the output port 170 to the brake B3. Thus, the fifth gear step is established.

(3) Others (i) D→N→D Operation of Shift Lever During Vehicle Running

During the vehicle running, even when the shift lever 72 is shifted, after shifting from the "D" position to the "N" position, from the "N" position to the "D" position again, the gear step established in the former "D" position i.e., the third gear step or the fifth gear step is maintained again in the latter "D" position by the bias force of the spring 126 or the line hydraulic pressure $P_{L1}$ (ii) Ignition Turn Off after Vehicle Stoppage When the ignition is turned off after stoppage of the vehicle, the fail-safe gear step switching valve 120 is maintained at the low-speed side position due to the decreased line hydraulic pressure $P_{L1}$ by bias force of the spring 126 and the third gear step is uniformly established.

According to this embodiment, following advantages can be obtained. Firstly, the fail-safe gear step switching valve 120 of the hydraulic controlling circuit 100 is constructed to be maintained at one of the first position and the second position. The first position establishes the low-speed side fail-safe gear step (third gear step) set in advance based on the control pressure $P_{SLC1}$ just before failure occurrence, while the second position establishes the high-speed side fail-safe gear step (fifth gear step) set in advance based on the control pressure $P_{SLC2}$ just before failure occurrence. Thus, the hydraulic controlling circuit 100 can set, upon failure occurrence of the solenoid valve device (linear solenoid valves SLC1, SLC2, SLB3), the third gear step or the fifth gear step depending on the vehicle condition when the failure of the solenoid valve device occurred.

During the vehicle running in the high-speed, the fail-safe gear step switching valve 120 is maintained at the second position for establishing the fifth gear step based on the line hydraulic pressure $P_{L1}$. Accordingly, in spite of the DON operation of the shift lever 72, the fail-safe gear step switching valve 120 is maintained at the second position, so that the fifth gear step is established again even if the shift lever 72 is further shifted to the "D" position. As a result, suitable vehicle running upon failure occurrence of the solenoid valve device can be secured. Especially, even when the D→N→D operation is performed, during the vehicle running in the fifth gear step i.e., in the high-speed, the third gear step is not established, so that sense of incongruity by the driver is avoided to secure the suitable vehicle running after failure occurrence of the solenoid valve device.

Secondly, the fail-safe gear step switching valve 120 is switched to respectively the first position by the control pressure $P_{SLC1}$ to output the D-range pressure $P_D$ to the clutch C1, or to the second position by the control pressure $P_{SLC2}$ to output the D-range pressure $P_D$ to the clutch C2. Thus, if the failure occurs during the vehicle running under establishment of the low-speed side gear step at which the control pressure $P_{SLC1}$ is outputted, the first position of the fail-safe gear step switching valve 120 selected at this time to establish the third gear step is maintained. Accordingly, different from the case of uniformly establishing the fifth gear step upon the failure occurrence the solenoid valve device (linear solenoid valves SLC1, SLC2, SLB3), during the vehicle running in the low-speed side gear step, lack of the drive force is avoided to secure the suitable vehicle running after failure occurrence.

To the contrary, if the failure occurs in the vehicle running under establishment of the high-speed side gear step at which the control pressure $P_{SLC2}$ is outputted, the second position of the fail-safe gear step switching valve 120 selected at this time to establish the fifth gear step is maintained. Accordingly, different from the case of uniformly establishing the third gear step upon failure occurrence during the vehicle running in the low-speed side gear step, sense of incongruity of the driver resulted from increased rotation speed of the engine exceeding the excessive rotation speed area and the strong engine brake are avoided to secure the suitable vehicle running after failure occurrence.

Thirdly, the hydraulic controlling circuit 100 includes, in addition to the fail-safe gear step switching valve 120, the normal/failure switching valve 122 switched, upon failure occurrence the solenoid valve device (linear solenoid valves SLC1, SLC2, SLB3) from the normal side position to the fail side position. The normal/failure switching valve 122 allows, at the normal side position thereof, supplying of the control pressure $P_{SLC1}$ to the clutch C1, the supplying of the control pressure $P_{SLC2}$ to the clutch C2, and supplying of the control pressure $P_{SLB3}$ to the brake B3, while it allows at the failure side position thereof, supplying of the D-range pressure $P_D$ from the fail-safe gear step switching valve 120 to the clutch C1 or the clutch C2, and supplying of the line hydraulic pressure $P_{L1}$ to the brake B3. Accordingly, in the normal state, regardless of position of the spool 124 of the fail-safe gear step switching valve 120, that is not via the fail-safe gear step switching valve 120, the control pressure $P_{SLC1}$, the control pressure $P_{SLC2}$ and the control pressure $P_{SLB3}$ can be respectively supplied to the clutch C1, the clutch C2 and the brake B3 for engagement or release thereof.

Further, when the failure the solenoid valve device (linear solenoid valves SLC1, SLC2, SLB3) occurs during the vehicle running under establishment of the low-speed side gear step by the control pressure $P_{SLC1}$, the clutch C1 is brought to the engaged state by the D-range pressure $P_D$ outputted in accordance with the first position of the fail-safe gear step switching valve 120, and the brake B3 is brought to the engaged state by the line hydraulic pressure $P_{L1}$ to establish the low-speed side fail safe gear step by the third gear step. Also, when the failure occurs in the running vehicle in which the high-speed side gear step is established by the control pressure $P_{SLC2}$, the clutch C2 is brought to the engaged state by the D-range pressure $P_D$ outputted in accordance with the second position of the fail-safe gear step switching valve 120, and the brake B3 is brought to the engaged state by the line hydraulic pressure $P_{L1}$ to establish the high-speed side fail safe gear step by the fifth gear step.

Also, the linear solenoid valves SLC1, SLC2 and SLB3 all of which are the normally-closed type linear solenoid valves do not output the hydraulic pressure (controlling pressure) upon failure occurrence.

Fourthly, according to this embodiment, the fail-safe gear step switching valve 120 is returned, upon failure occurrence of the solenoid valves device, to the first position due to drop of the line hydraulic pressure $P_{L1}$. That is, if the operation oil is not outputted from the oil pump 28 upon failure occurrence of the solenoid valve device, that is the ignition is turned off to stop the engine for example, the dropped line hydraulic pressure $P_{L1}$ of the lower pressure value resets maintenance of the valve position of the fail-safe gear step switching valve 120. Thus, the valve position is initialized to switch the fail-safe gear step switching valve 120 to the first position.

With this, when the line hydraulic pressure $P_{L1}$ once dropped is generated again, that is the ignition is turn-on after turn-off thereof for example, the D-range pressure $P_D$ outputted to the oil path 138 operates to engage the clutch C1 and the brake B3 for establishing the third gear step. Establishment of the third gear step, in the case the ignition being turned on after turn-off thereof upon the vehicle stoppage in the failure state, can secure the starting and low-speed running of the vehicle after stoppage thereof.

Finally, according to this embodiment, the line hydraulic pressure $P_{L1}$ based on the operation oil pressure from the oil pump 28 of which pressure value is not changed in spite of the valve position change of the manual valve 114 is pressure-controlled by the first pressure regulator valve 102, and is then supplied to the fail-safe gear step switching valve 120. In other words, the line hydraulic pressure $P_{L1}$ based on the operation oil pressure from the oil pump 28 and is pressure-regulated by the first pressure regulator valve 102, is supplied to the fail-safe gear step switching valve 120 directly not via the manual valve 114. With this, if the D→N operation is performed during the vehicle running in the fifth gear step established upon failure occurrence of the solenoid valve device (linear solenoid valves SLC1, SLC2 and SLB3), the second position of the fail-safe gear step switching valve 120 is maintained, so that the fifth gear step is established again when the shift lever 72 is further shifted to the "D" position.

The present invention can be embodied, in addition to the embodiment as described in the above, in various modes as will be described in the following. Firstly, in the above embodiment, the fail-safe gear step switching valve 120 is maintained, upon failure occurrence of the solenoid valves device (linear solenoid valves SLC1, SLC2, SLB3), at the position where it was just before failure occurrence of the solenoid valve device (linear solenoid valves SLC1, SLC2, SLB3) so that the fail-safe gear step switching valve 120 is maintained at the second position based on the line hydraulic pressure $P_{L1}$ as the base pressure. This line hydraulic pressure $P_{L1}$ is sufficiently a hydraulic pressure supplied to the various parts of the hydraulic controlling circuit 100 regardless of the position change of the manual valve 114 relating to shifting operation of the shifting lever 72. For example, the line hydraulic pressure $P_{L2}$ and the modulation pressure $P_M$ both are the hydraulic pressures based on the operation oil outputted from the oil pump 28 similar to the line hydraulic pressure $P_{L1}$, can be used for the line hydraulic pressure $P_{L1}$.

In the above embodiment, upon failure occurrence of the solenoid valve device (linear solenoid valves SLC1, SLC2, SLB3), the third gear step as the low-speed side gear step and the fifth gear step as the high-speed side gear step are established. However, other gear steps can be established depending on the vehicle property and the number of the speed-change steps. For example, in the above automatic transmission 10, the linear solenoid valve SLB1 can be used for the linear solenoid valve SLB3 as the third solenoid pressure regulation valve, and the brake B1 can be used for the brake B3 as the third hydraulic type friction engaging apparatus, so that the second gear step as the low-speed side gear step and the sixth gear step as the high-speed side gear step can be set.

In the normal/failure switching valve 122 of the above embodiment, the control pressure $P_{SLB3}$ is supplied to the input port 168 from the linear solenoid valve SLB3 based on the line hydraulic pressure $P_{L1}$, the line hydraulic pressure $P_{L1}$ is supplied to the input port 176, and any of the control pressure $P_{SLB3}$ and the line hydraulic pressure $P_{L1}$ is supplied to the brake B3 from the supply port 170. However, the control pressure $P_{SLB3}$ can be supplied to the input port 168 from the linear solenoid valve SLB3 based on the D-range pressure $P_D$, the D-range pressure $P_D$ can be supplied to the input port 176, and any of the control pressure $P_{SLB3}$ and the D-range pressure $P_D$ can be supplied to the brake B3 from the supply port 170.

In such case where the D-range pressure $P_D$ is used for the line hydraulic pressure $P_{L1}$ as the hydraulic pressure to be supplied to the brake B3, the control pressure $P_{SLB3}$ or the D-range pressure $P_D$, or the reverse pressure $P_R$ to be supplied is outputted to the brake B3 via the shuttle valve 116. This is similar to the case where the oil path is constructed so that the control pressure $P_{SLB2}$ or the reverse pressure $P_R$ to be supplied is outputted to the brake B3 via the shuttle valve 116.

In the normal/failure switching valve 122 of the above embodiment, the spool 152 is switched or shifted between the normal side position and the fail side position, in accordance with the relation among the modulation pressure $P_M$, the control pressure $P_{SLFS}$ outputted from the linear solenoid valve SLFS based on the line hydraulic pressure $P_{L1}$, and bias force of the spring 154. However, various structure other tan the above embodiment can be employed, as long as the spool 152 is switched to the normal side position in the normal state of the solenoid valve device, and is switched to the fail side position in the failure state thereof. For example, for the modulation pressure $P_M$ supplied to the linear solenoid valve SLFS to form the base of the control pressure $P_{SLFS}$, the line hydraulic pressure $P_{L1}$ or $P_{L2}$, or the control pressure $P_{SLT}$ can be used In addition, instead the linear solenoid valve SLFS, on-off solenoid valve of normally-closed type can be used. Further, the normal/failure switching valve 122 can be a direct shifting type in which the spool 152 is shifted directly by the linear solenoid valve.

Needless to say, the present invention can be carried out, other than the above embodying modes, in the deformed modes in accordance with knowledge of the skilled person in this technical field, without deviating the gist of the present invention.

What is claimed is:

1. A hydraulic controlling apparatus for an automatic transmission for vehicle, comprising:
   a hydraulic pump that outputs an operation oil pressure;
   a manual valve that generates a hydraulic pressure for forward running based on the operation oil pressure, when a valve position of the manual valve is switched in accordance with a shifting operation to a forward running position;
   a first solenoid valve device, that, when the first solenoid valve is in a normal state selectively supplies an output hydraulic pressure to plural hydraulic type frictionally engaging devices to establish plural speed-change steps of the automatic transmission; and
   a fail-safe gear step switching valve that (i) upon a failure state of the first solenoid valve, switches to a first position to establish a low-speed side fail-safe gear step or to a second position to establish a high-speed side fail-fail gear step, of plural speed-change steps of the automatic transmission, both the first position and the second position being set in advance based on the output hydraulic pressure from the solenoid valve device just before failure thereof occurs, so that the low-speed side fail-safe gear step or the high-speed side fail-safe gear step is selected in an alternative way, and (ii) is held at the second position based on a base pressure which is based on the operation oil pressure from the hydraulic pump, wherein the base pressure is supplied independent of the valve position of the manual valve.

2. A hydraulic controlling apparatus according to claim 1, wherein the fail-safe gear step switching valve is held at the first position based on a decreased base pressure and biasing force of a bias member.

3. A hydraulic controlling apparatus for an automatic transmission for vehicle, comprising:
   a hydraulic pump that outputs an operation oil pressure;
   a manual valve that generates a hydraulic pressure for forward running based on the operation oil pressure, when a valve position of the manual valve is switched in accordance with a shifting operation to a forward running position;

a solenoid valve device, that, when the first solenoid valve is in a normal state, selectively supplies an output hydraulic pressure to plural hydraulic type frictionally engaging devices to establish plural speed-change steps of the automatic transmission; and a fail-safe gear step switching valve that (i) upon a failure state of the solenoid valve, switches to a first position to establish a low-speed side fail-safe gear step or to a second position to establish a high-speed side fail-fail gear step, of plural speed-change steps of the automatic transmission, both the first position and the second position being set in advance based on the output hydraulic pressure from the solenoid valve device just before failure thereof occurs, so that the low-speed side fail-safe gear step or the high-speed side fail-safe gear step is selected in an alternative way, and (ii) is held at the second position based on a base pressure which is based on the operation oil pressure from the hydraulic pump and which does not fluctuate regardless of the valve position of the manual valve, wherein the fail-safe gear step switching valve is held at the first position based on a decreased base pressure and biasing force of a bias member, the solenoid valve device includes a first solenoid pressure regulation valve that supplies the output hydraulic pressure to a first hydraulic type frictionally engaging device for establishing the low-speed side gear step including a lowest-speed gear step and the fail-safe gear step switching valve, and a second solenoid pressure regulation valve that supplies the output hydraulic pressure to a second hydraulic type frictionally engaging device for establishing the high-speed side gear step including a highest-speed gear step and the fail-safe gear step switching valve, and the fail-safe gear step switching valve is switched to the first position based on the output hydraulic pressure from the first solenoid pressure regulation valve, and switched to the second position based on the output hydraulic pressure from the second solenoid pressure regulation valve.

4. A hydraulic controlling apparatus according to claim 3, wherein the fail-safe gear step switching valve in the first position thereof outputs the hydraulic pressure for forward running to the first hydraulic type frictionally engaging device, and in the second position thereof outputs the hydraulic pressure for forward running to the second hydraulic type frictionally engaging device.

5. A hydraulic controlling apparatus according to claim 4, wherein the solenoid valve device further includes a third solenoid pressure regulation valve that supplies the output hydraulic pressure to a third hydraulic type frictionally engaging device establishing the low-speed side fail-safe gear step and the high-speed side fail-safe gear step together with the first hydraulic type frictionally engaging device and the second hydraulic type frictionally engaging device.

6. A hydraulic controlling apparatus according to claim 5, further including a normal/failure switching valve to be switched to a normal side position upon normal state of the solenoid valve device for allowing the output hydraulic pressure from the solenoid valve device to be supplied to the hydraulic type frictionally engaging device, or a failure side position upon failure state of the solenoid valve device for allowing the hydraulic pressure for forward running or the base pressure to be supplied to the hydraulic type frictionally engaging device.

7. A hydraulic controlling apparatus according to claim 6, wherein the normal failure switching valve in the normal side position thereof allows the output hydraulic pressure from the first solenoid pressure regulation valve to be supplied to the first hydraulic type frictionally engaging device, from the second solenoid pressure regulation valve to be supplied to the second hydraulic type frictionally engaging device, and from the third solenoid pressure regulation valve to be supplied to the third hydraulic type frictionally engaging device, and in the failure side position thereof allows the hydraulic pressure for forward running from the fail-safe gear step switching valve to be supplied to the first hydraulic type frictionally engaging device or second hydraulic type frictionally engaging device, and the base pressure or the hydraulic pressure for forward running to be supplied to the third hydraulic type frictionally engaging device.

8. A hydraulic controlling apparatus according to claim 7, wherein the first solenoid pressure regulation valve, second solenoid pressure regulation valve and third solenoid pressure regulation valve are normally-closed type pressure regulation solenoid valves.

9. A hydraulic controlling apparatus according to claim 8, wherein the base pressure is a pressure-regulated value regulated by the pressure regulated valve.

10. A hydraulic controlling apparatus according to claim 1, further comprising a second solenoid valve device, that, when the second solenoid valve is in a normal state, supplies a predetermined control pressure to a normal/failure switching valve.

11. A hydraulic controlling apparatus according to claim 10, wherein the second solenoid valve device is independently controlled by an electronic controlling apparatus.

12. A hydraulic controlling apparatus according to claim 10, wherein the predetermined control pressure is less than a modulate hydraulic pressure.

13. A hydraulic controlling apparatus according to claim 12, wherein the predetermined control pressure is in a range from 0 to 80% of the modulate hydraulic pressure upon the normal state.

* * * * *